United States Patent

Bleikolm et al.

[11] Patent Number: 6,160,046
[45] Date of Patent: *Dec. 12, 2000

[54] ABRASION-REMOVABLE COATING AND METHOD OF APPLICATION

[75] Inventors: Anton Bleikolm, Ecublens; Olivier Rozumek, St. Martin; Patrick Veya, Morges, all of Switzerland

[73] Assignee: SICPA Holding S.A., Prilly, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/904,342

[22] Filed: Jul. 31, 1997

[30] Foreign Application Priority Data

Apr. 15, 1997 [EP] European Pat. Off. ............ 97810224

[51] Int. Cl.$^7$ ...................................................... C08K 5/09
[52] U.S. Cl. ................................................ 524/284
[58] Field of Search ................................... 524/284

[56] References Cited

U.S. PATENT DOCUMENTS

| | | | |
|---|---|---|---|
| 3,895,035 | 7/1975 | Berg | 524/322 |
| 4,097,290 | 6/1978 | Muller | 523/161 |
| 4,284,682 | 8/1981 | Frosch | 524/371 |
| 4,329,264 | 5/1982 | Muller | 524/322 |
| 4,365,029 | 12/1982 | Reizer | 524/364 |
| 4,390,646 | 6/1983 | Ferguson | 523/161 |
| 4,407,985 | 10/1983 | Muller | 523/161 |
| 4,548,845 | 10/1985 | Parsons | 524/377 |
| 4,684,420 | 8/1987 | Bryant | 156/116 |
| 4,822,841 | 4/1989 | Murray | 524/356 |
| 5,401,795 | 3/1995 | Brock | 524/539 |

*Primary Examiner*—Paul R. Michl
*Attorney, Agent, or Firm*—Shoemaker and Mattare

[57] ABSTRACT

The invention relates to abrasion-removable coating compositions suited to achieve temporary masking of variable data. The compositions are based on elastomeric resin in solution and particulate additives comprising at least one pigment. The ratio of resin to powder additives is 0.2 to 2.

13 Claims, No Drawings

ABRASION-REMOVABLE COATING AND METHOD OF APPLICATION

The present invention relates to the field of abrasion-removable coating or ink, more particularly compositions which are useful to manufacture abrasion removable coatings and still more particularly to scratch-off lottery tickets. The present invention also relates to the manufacture of abrasion-removable coating compositions and the method of applying them to a substrate.

Probably the most important application of abrasion removable coatings in the field of graphic arts is the manufacturing of lottery tickets.

In this kind of application an abrasion removable layer is used to achieve a temporary masking of alphanumerical and/or graphic information such as numbers, drawings, captions or logos. The player can immediately identify a winning ticket by scratching the opaque layer off with a fingernail or any suitable object like a coin. In addition to lottery tickets, other printed items like promotional games or advertisements may be prepared using such abrasion-removable layers.

Removable coating or ink compositions are basically mixtures of a varnish and an opacifying pigment. Such mixtures are formulated so as to fulfill appropriate requirements in areas of printability, opacity and scratchability.

The varnish is a resin solution. To formulate the scratch-off inks of the prior art, styrene-butadiene copolymers in solution in hydrocarbon solvents such as petroleum ethers and white-spirits are generally used. They give the dried ink layer its rubbery consistency.

The role of the opacifying pigment is to ensure that it will not be possible to fraudulently read the variable information through the dried ink layers. Organic pigments like carbon black or phthalocyanine blue as well as inorganic ones like aluminum or bronze powders or titanium dioxide may be used alone or in combination. The number and the thickness of the ink layers are adjusted so as to reach an optimal opacity.

Optionally, other additives such as fillers, leveling agents, defoamers, and/or slip aids may be required to adapt the ink to specific printing conditions. In certain instances pigments, such as titanium dioxide, act as fillers as well.

Various ink properties such as ink setting, viscosity, press stability, solvent release, scratchability, shelf life, etc. depend on the varnish components. For most of these parameters the role of the solvents is of utmost importance. In addition to providing solvency during the varnish manufacturing step by dissolving and carrying the various resin components, the solvents provide the primary means to adjust ink drying, ink setting and ink press stability. A right balance between these three parameters is a key factor. In case the press stability is insufficient, ink setting or drying are readily observed on the press with a concomitant loss of print quality. When facing such a situation, the printer systematically stops the press to perform cleaning operations which impact very negatively on productivity. Ideally, ink setting and drying should even not start before the ink layer is formed on the substrate.

On the other hand, an extremely press-stable ink may lead to insufficient setting and drying specifically on poorly absorbing substrates.

To effectively dry scratch-off inks, the printing presses are equipped with drying ovens where the printed substrate is generally heated by hot air. The air temperature is normally in the range of 60 to 180° C.

Due to legal evolution in the field of health, safety and environment in most countries over the last ten years the present situation turns out to be much more complicated. This means that in addition to purely technical criteria the ink developer has to take into account these new requirements.

Regarding safety, the situation is actually very critical with the solvents used in the abrasion-removable inks of the prior art. As mentioned before, these solvents are of the hydrocarbon type and as such rarely combine high flash points and acceptably low boiling range values.

As a practical consequence, a flash-point above room temperature (20–25° C.) is impossible to achieve while retaining good setting and drying performances. Most of the inks for scratch-off lottery presently available have flash-points of less than 20° C. This results in considerable explosion hazards at the ink manufacturing plant, at the printing works and/or during transportation.

Another drawback of the solvents presently used to formulate abrasion-removable inks is that they most often contain aromatics in order to solubilize the resinous fraction of the binder. In many countries legislation has been adopted which severely restricts the emission of aromatics at the workplace due to their adverse effect on human health.

Water-based compositions such as those described in the US patent 5,215,576 and in German DE-A1-3614653 do not present these drawbacks. However, they gain acceptance only with difficulty mainly because they provide the formulator and indirectly the user with less flexibility. Not all metallic opacifying pigments are stable in aqueous media and thus a right setting/press stability/drying balance may be difficult to achieve. In particular, this type of ink, being based on dispersions of high molecular weight polymers which intrinsically have a strong tendency to form insoluble layers, presents the printer with a critical situation in case of premature drying since cleaning operations will undoubtedly be long and tough.

EP-A2-0,233,007 discloses a heat-gellable abrasion-removable ink composition based on a synthetic resin dissolved in high amounts of a plasticizer which acts as a solvent. Comparative tests have shown that the hardening of such compositions is very slow and would prevent them from being used on modern high-speed presses. Moreover, the use of white spirits as a viscosity regulator is suggested. Finally, the strong and well-known tendency for plasticizers to migrate will probably cause the properties of the layer to change with time.

In this context, there is clearly a need for abrasion-removable compositions free from any of the shortcomings displayed by the compositions of the prior art.

The main object of the present invention is to provide an abrasion-removable composition which is easy to apply, has good drying properties and adheres sufficiently firmly to have good tamper-evidence behavior.

To reach this goal it was necessary to completely redesign the coating formulation and more specifically to redesign the binder component which actually provides the final product with many of its desired properties.

By selecting an elastomeric resin capable of being dissolved in organic solvents and adding pigments in powdered form, a scratch-off layer may be obtained which is both stable and adhering to the substrate on the one side and easily destroyed when tampering occurs on the other side. Elastomeric resins are polymers having a glass transition temperature (in case of amorphous polymers) or a melting temperature (in case of partly crystalline polymers) below 0° C. (as specified in the German standard DIN 7724 including appendix of February 1972).

The additives in powdered form, particularly the pigments, are not dissolved in the solvents, thereby increasing the heterogeneousness and the tamper-evidence features of the dried scratch-off layer. The preferred resin materials are amorphous polymers.

"Powder" in that context refers to particulate additives, i.e. mainly to pigments and fillers.

By selecting a resin : powder ratio of 0.2 to 2, preferably of 0.2 to 1, the adhesion and film-forming properties on one hand and the easy-to-destroy properties or the tamper-evidence properties on the other, may be optimized. Higher amounts of resin result in more compact, elastic layers. Higher amounts of powder result in more heterogenous layers which come off the substrate in small flakes or portions.

In a preferred composition of the present invention only polar solvents are used to dissolve compatible polar resins, but not the pigments. The term "polar solvent" encompasses all organic molecules, liquid at room temperature, which possess a permanent dipolar moment. A necessary condition for observing such a dipolar moment is that the molecule contains at least one heteroatom like nitrogen, oxygen or sulphur.

Well-known families of solvents corresponding to this definition are amines, alkanolamines, amides, alcohols, glycols, ethers, esters, ketones, chlorinated solvents and sulfoxides. Amongst all polar solvents, those containing oxygen only as heteroatoms (strictly oxygenated) ones are those upon which the preferred inks according to the invention rely. Preferred oxygenated solvents to formulate ink compositions of the invention are alcohols, glycols, ketones, ethers and esters and mixtures thereof.

Regarding flash-point, the solvent or solvent mixture should be chosen in order for the flash point of the final ink to be higher than 20° C. and still more preferably higher than 30 C. The flashpoint is determined according to German standard DIN 53/213.

Predicting the flash-point of a solvent mixture knowing the flash point of each solvent is not always straightforward. As a general rule the flash point of a mixture of solvents is equal to or higher than the flash point of the most flammable solvent contained in this mixture, but it can also be far above this limit. In the absence of a specific rule several examples are given to illustrate how to formulate the inks of the invention.

In addition to providing formulations for abrasion-removable coatings having much higher flammability limits while being free from any aromatic compound, the compositions according to the invention present another advantage over the compositions of the prior art which is that they are more environmentally friendly. Regarding toxicity to aquatic organisms, strictly oxygenated solvents compare generally very favorably to hydrocarbon solvents. This is exemplified below:

|  |  | Concentration to kill 50% (mg/l) |
|---|---|---|
| hydrocarbons | mixture of aliphatic and napthenic hydrocarbons | ≦40 |
|  | m-xylene | about 8.5 |
| strictly oxygenated | 1-methoxy-2-propanol | >20000 |

The above numbers refer to the concentration (in mg/l) of each expected to kill 50% of a population of experimental fishes based on G. Rippen, "Handbuch Umweltchemikalien". Ed: Ecomed.

The change in formulation from the hydrocarbon solvents ordinarily used to polar oxygenated ones actually necessitated a complete change of the binder system since the styrene-butadiene copolymers commonly employed in the hydrocarbon solvents are not soluble in polar solvents.

A wide variety of polar resins are soluble in these polar solvents, the most common classes being cellulose-based resins, polyamides, acrylics, vinyl resins, polyesters, epoxies and phenolics as well as all their derivatives. None of these compounds, however, display the rheological characteristics needed to obtain abrasion-removable ink compositions.

In these conditions, synthetic materials such as acrylic or acrylonitrile modified rubbers and polyurethane elastomers are preferably used. Such materials have been mainly employed for injection molding or can-coating applications. These resins are characterized by a low glass transition temperature (i.e. less than 20° C.) and a high elongation at break; they provide the dried ink layer with appropriate scratch properties.

Preferably, the resin is a urethane or acrylic rubber and the solvent is an oxygen containing solvent such as alcohols, glycols, ethers and esters.

Another important feature of the compositions of the present invention is that they allow the use of rather low molecular weight resin solutions and their ability to stabilize rather high amounts of water. Depending on the resin solution considered, up to 35% of the solvent content may be replaced by water. As opposed to the aqueous scratch-off compositions of the prior art, the compositions of the invention modified in this way do not make cleaning operations more complicated in case of premature drying because they are not based on high molecular weight dispersions, but rather on low molecular weight resin solutions.

It will be appreciated that the presence of water actually augments the advantages provided by the compositions of the invention since it increases the ink flash-point while simultaneously making the ink composition more environmentally friendly through the reduction in organic solvent content.

Finally, the compositions of the invention may be applied by any of the conventional printing techniques such as gravure, flexo, screen, offset and letterpress printing.

To control viscosity, appropriate quantities of additional solvents, water, resin or fillers may be used. Fine tuning may be achieved by adding water and/or solvent.

Additional additives, such as stabilizers, wetting agents, film-forming agents, leveling and slip agents, and/or defoaming agents may be used to adapt the properties of the composition to specific requirements.

The adherence and film-forming properties of the composition may be adapted to a broad variety of applications and substrates. Particularly, the new composition may be used directly on printed matter or in combination with a release coating which is applied between the substrate bearing indicia to be covered and the scratch-off coating. Release coatings may be used which contain, for example, wax or silicone compositions.

The invention will now be further described with reference to the following examples.

EXAMPLE 1a

A black scratch-off formulation for flexo printing was made as follows:

|   | parts by weight |
|---|---|
| 1. Uraflex EU 190 B1 (DSM) | 300 |
| 2. Carbon black | 90 |
| 3. Leveling agent | 3 |
| 4. 1-methoxy-2-propanol | 607 |

Uraflex EU 190 B1 is an urethane elastomer (resin) solution at 30% in isobutanol. Therefore, the resin content is 90 parts by weight and equal to the content of carbon black powder having also 90 parts by weight. The resin:powder ratio is 1.

To prepare the ink all the ingredients were blended using a mixer.

The ink obtained had a Brookfield viscosity of 100 mPa at 25° C. It was then printed with a hand-proofer [150 lines/inch; 2 layers] on a Black and White™ lottery paper bearing ink-jet variable information protected by 2 layers of a UV-curing release varnish. Opacity and scratchability were both good.

The ink flash-point was then measured in an Abel-Pensky closed-up device. The result was 30±0.5° C.

Lottery tickets prepared by superimposing 2 layers of the black flexo ink of Example 1a and 3 layers of the silver flexo ink of Example 2 have been tested at the "Institute de Police Scientifique" in Lausanne and judged as offering a very good protection against attempts to fraudulently read the variable information.

EXAMPLE 1b

A black scratch-off formulation for flexo printing was made a follows:

|   | parts by weight |
|---|---|
| 1. Uraflex EU 190 B1 (DSM) | 335 |
| 2. Carbon black | 55 |
| 3. Leveling agent | 3 |
| 4. 1-methoxy-2-propanol | 607 |

The Uraflex EU 190 B1 urethane elastomer solution contains 30% resin, i.e. 100.5 parts by weight. The resin:carbon black-powder ratio is 100.5:55 or 1.83.

EXAMPLE 2

A silver scratch-off formulation for flexo printing was made as follows.

|   | parts by weight |
|---|---|
| 1. Uraflex EU 190 B1 | 160 |
| 2. Aluminum powder | 78 |
| 3. Titanium dioxide | 80 |
| 4. Fumed silica | 38 |
| 5. Butylglycol | 165 |
| 6. 1-methoxy-2-propanol | 479 |

The resin:powder ratio was 48:(78+80+38) or 0.245.

This ink was prepared and printed the same way as the ink of Example 1 with good results in matter of scratchability and opacity as well. The flash-point was 37±0.5° C.

EXAMPLE 3

In the ink of Example 1a 150 parts of 1-methoxy-2-propanol were replaced by water. The flash point of the ink thus obtained was advantageously increased to 37.7° C. as compared to 30±0.5° C. for Example 1a.

EXAMPLE 4

The isobutanol contained in the resin solution Uraflex EU 190 B1 was stripped off under vacuum and replaced by 1-methoxy-2-propanol. Starting from the resulting resin solution an ink was prepared according to the formula disclosed in example 1. The flash point of this ink was again advantageously increased to 32.6±0.9° C. as compared to 30±0.5° C. for Example 1a.

EXAMPLE 5

A silver scratch-off ink formulation for screen printing was prepared as follows:

|   | parts by weight |
|---|---|
| 1. Uraflex EU 190 B1 | 300 |
| 2. Aluminum powder | 120 |
| 3. Titanium dioxide | 100 |
| 4. Calcium carbonate | 150 |
| 5. Leveling agent | 3 |
| 6. Defoamer | 2 |
| 7. Propylglycol | 315 |
| 8. Fumed silica | 10 |

The resin:powder ratio was 0.24.

The ink was prepared as in Example 1. The ink viscosity was 0.8 Pa at 25° C. and the flash point 40±0.5° C. The ink was then printed by screen printing using a 55T screen on the substrate described in Example 1. Results were good both with respect to opacity and to scratchability.

EXAMPLE 6

A silver scratch-off formulation for flexo printing was prepared as follows:

|   | parts by weight |
|---|---|
| 1. Europrene AR 153 EP (Enichem) | 50 |
| 2. n-butyl acetate | 785 |
| 3. Aluminum powder | 80 |
| 4. Titanium dioxide | 80 |
| 5. Leveling agent | 3 |
| 6. Defoamer | 2 |

Europrene AR 153 EP is an acrylic rubber is supplied in block form which is normally used for injection molding applications. A piece of the block is dissolved in n-butyl acetate; the resin solution is then mixed with the remaining quantity of butyl acetate and all the other ingredients. The ink obtained has a viscosity around 125 mPa at 25° C. and a flash point of 24° C. The resin:powder ratio is 50:(80+80) or 0.31. Opacity and scratchability are good.

The ink may also be printed directly on the surface without release coating subject to appropriate substrate properties, such as polymer substrates or film-coated surfaces.

Lottery tickets prepared by superimposing 2 layers of the black flexo ink of Example 1a and 3 layers of the silver flexo ink of Example 2 have been tested at the "Institute de Police Scientific" in Lausanne and judged as offering a very good protection against attempts to fraudulently read the content.

The results of Examples 1b, 3, 4, 5 and 6 were tested in accordance with the above-mentioned procedure. In all cases, opacity and scratchability were good.

It is to be understood that the foreqoing detailed description is qiven merely by way of illustration and that many variations may be made therein without departing from the spirit of this invention.

What is claimed is:

1. An ink composition adapted for forming an abrasion-removable layer on a document, the layer being capable of disguising underlying information, said composition consisting essentially of at least one polar elastomeric resin having a glass transition temperature or a melting temperature below 0° C.;

said resin being an acrylic modified rubber;

at least one polar organic solvent which is free from any aromatic compound to dissolve said resin; and particulate additives which are insoluble in said solvent and comprise at least one pigment and/or filler having opacifying properties;

wherein the weight ratio of resin to particulate additives is 0.2 to 2, said composition having a flash point exceeding 20° C. and being removable after hardening by means of abrasion whereby the disguising portion of the document may be exposed to scratching.

2. The coating composition of claim 1, wherein the particulate additives are in the form of powder and/or particles.

3. The coating composition of claim 1, wherein said weight ratio is 0.2 to 1 by weight.

4. The coating composition according to claim 1, wherein said pigment and/or filler comprises inorganic substances.

5. The coating composition according to claim 1, further comprising at least one second additive selected from the group consisting of stabilizers, wetting agents, film-forming agents, leveling and slip agents, defoaming agents, driers or drying agents, and additional solvents to control viscosity.

6. The coating composition according to claim 1, wherein the solvent selected results in the composition having a flash point exceeding 25° C.

7. The coating composition according to claim 1, wherein the solvent selected results in the composition having a flash point exceeding 30° C.

8. The coating composition according to claim 1, wherein said solvent is selected from the group consisting of alcohols, glycols, ketones, ethers and esters.

9. The coating composition according to claim 1, wherein up to 35% by weight of the solvent is replaced by water.

10. A method of applying a printing ink having a flash point exceeding 20° C. composition to a document comprising the steps of:
    (a) providing a document carrying indicia on its surface to be disguised;
    (b) providing a printing ink composition consisting essentially of
        (1) a solution of at least one polar elastomeric resin having a glass transition temperature or a welding temperature below 0° C. in at least one polar organic solvent, said solvent being free from any aromatic compound; and
        (2) particulate additives not being soluble in said solvent and comprising at least one pigment and/or filler having opacifying properties; wherein the weight ratio of resin to particulate additives is 0.2 to 2;
    (c) printing said printing ink composition as a layer over said indicia; and
    (d) allowing the solution to dry.

11. A method of applying a printing ink having a flash point exceeding 20° C. composition to a document comprising the steps of
    (a) providing a document carrying indicia on its surface to be disguised;
    (b) applying a release coating to the document over the indicia;
    (c) providing a printing ink composition consisting essentially of
        (1) a solution of at least one polar elastomeric resin having a glass transition temperature or a melting temperature below 0° C. in at least one polar organic solvent, said solvent being free from any aromatic compound; and
        (2) particulate additives not being soluble in said solvent comprising at least one pigment and/or filler having opacifying properties; wherein the weight ratio of resin to particulate additives is 0.2 to 2;
    (d) printing said printing ink composition as a layer over said indicia; and
    (e) allowing the solution to dry.

12. A method according to claim 10, wherein the printing ink composition is applied to the document by means of gravure, flexo, screen, offset and letterpress printing.

13. A method according to claim 11, wherein the printing ink composition is applied to the document by means of gravure, flexo, screen, offset and letterpress printing.

* * * * *